Patented Feb. 16, 1943

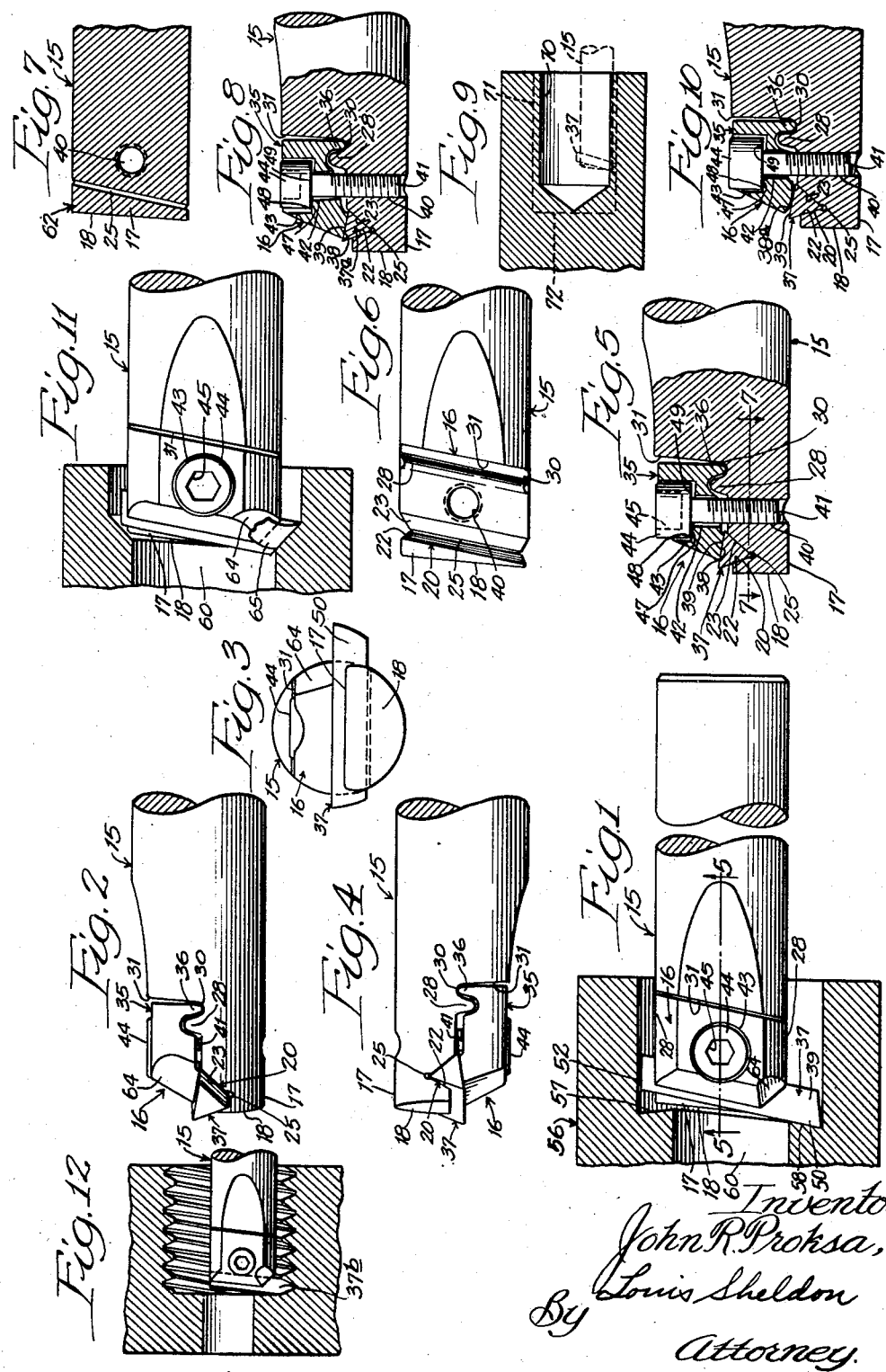
Feb. 16, 1943. J. R. PROKSA 2,310,992
BORING DEVICE
Filed Jan. 21, 1939

2,310,992

UNITED STATES PATENT OFFICE 2,310,992

BORING DEVICE

John R. Proksa, Chicago, Ill.

Application January 21, 1939, Serial No. 252,163

2 Claims. (Cl. 77—58)

This invention relates to boring devices and is concerned more particularly with an improved boring bar and tool.

In the past, boring bars have been formed with holes through which the cutting tools have extended and in which they have been held by set screws. As a result, the tools, especially if they were of the more expensive type such as tungsten carbide, were often broken because of the concentration of force at the set screws. Another drawback of past boring tool constructions is that they come in blank form and have to be ground or otherwise specially formed at their ends into shape for cutting. Moreover, with past constructions using attached tools for forming holes of approximately ¼" diameter, more or less, it has been necessary to use boring bars of no greater diameter than the drilled or cored hole to be enlarged by the tool of the boring bar, because the bar would have to be too weak to support the tool due to holes for the tool and set screw.

It is to overcome the foregoing, among other, disadvantages of prior boring bar and cutting tool constructions that the present invention has been devised.

More specific objects of my invention are: the provision of a tool clamp by means of which the clamping pressure is distributed rather than localized; the provision of a boring bar of the character referred to, adapted to accommodate cutting tools of different sizes; the provision of a boring bar with a tool clamp of such structure that the cutting portion of the tool will be in advance of the bar; the provision of a boring bar tool clamp of such construction that the boring bar may be of larger diameter and thus the bar may be considerably stronger than those heretofore in use for comparable service; the provision of a cutting tool of uniform cross section throughout the length thereof and of a form ready for service when purchased; the provision of a cutting tool of such form that different edges thereof may be selectively placed in service; and the provision of a tool clamp of such character as to permit the use of smaller tools for service heretofore requiring the strength of larger tools.

Further objects and advantages of the invention will appear as the description proceeds.

The invention will be better understood upon reference to the following description and the accompanying drawing, in which:

Fig. 1 is a fragmentary plan view, partly in section and partly in elevation, of a piece of work with a drilled hole and a device constructed in accordance with one form of my invention operating thereon.

Fig. 2 is a fragmentary side elevation of the device appearing in Fig. 1.

Fig. 3 is a front end elevation of the device appearing in Figs. 1 and 2.

Fig. 4 is an elevation viewing the structure of Fig. 3 from the opposite side and inverted.

Fig. 5 is a fragmentary sectional view taken as indicated by the line 5—5 in Fig. 1.

Fig. 6 is a fragmentary plan view of the working end of a boring bar embodying features of my invention.

Fig. 7 is a fragmentary sectional view of the boring bar, taken as indicated by the line 7—7 in Fig. 5.

Fig. 8 shows the tool supporting part of Fig. 6 with a tool of a different size.

Fig. 9 shows the device when cutting a blind hole and forming a square bottom therein.

Fig. 10 shows a modified movable clamp jaw.

Fig. 11 is a view similar to Fig. 1 but with the cutting tool modified.

Fig. 12 is similar to Fig. 1 but shows a further modified tool for forming or finishing a threaded opening.

Referring now more particularly to the drawing, there is shown at 15 a boring bar such as may be supported in the slide rest of a lathe, for example, and having a portion of one end thereof removed as shown at 16, leaving a stationary jaw 17. Adjacent the end face 18 of said jaw is a groove 20 which preferably is of 60° V-shape, transversely, and extends longitudinally at an inclination to the axis of the bar corresponding to the angle at which the cutting edge of a tool to be mounted on the bar may be set. The forward face 22 of said groove may incline downwardly and rearwardly 70°, more or less, and the rear face 23 of said groove accordingly may incline downwardly and forwardly 50°, more or less, to the axis of the bar. The faces 22 and 23 may meet, but preferably a slot 25 is formed at the base of the groove so that the sides of the groove do not meet. The bottom of said slot is below the juncture of the sides of said groove. Thus the fit of a tool or bit in such groove will be proper, because the slot 25 will afford clearance for the edge of the tool, so that precise formation of a sharp corner of the groove is unnecessary.

The jaw 17 is also formed with an upstanding rib 28 preferably substantially parallel to said groove. A groove 30 is formed in said bar rearwardly of said rib, said groove terminating rearwardly at a wall 31 which extends beyond said rib transversely of the axis of said bar and in effect forms the rear boundary of the cut in the forward or working end of the bar.

A clamp element or plate 35 which may be separable from the bar 15 has a rib 36 adapted to have a loose fit in the groove 30. The element 35 constitutes a movable jaw cooperative with the relatively fixed jaw 17 for clamping a cutting tool 37 firmly in place. The element 35 is accordingly provided with a clamping face 38 which may be inclined for flatwise or substantially flatwise engagement selectively with any longitudinal face 39 of the tool 37. The loose fit of the rib 36 in the boring bar recess 30 enables the element 35 to adjust itself so that its clamping surface 38 will have substantially flat engagement with tools of different cross sectional sizes, as may be gathered from Figs. 5 and 8 at 37 and 37a, respectively. If desired, the clamping face may have any other form such as the slightly convex shape shown at 38a in Fig. 10. In any event the jaw 35 is arranged to securely clamp the bit against the walls of the slot 20.

The relatively stationary jaw 17 may be tapped as at 40 to receive a cap screw 41 which passes through a bore 42 in the relatively movable jaw 35. The jaw 35 may be counterbored as at 43 to receive the head 44 of the screw 41. The head may be formed in any suitable way to receive a turning device and, for illustrative purposes only, is shown as having an angular socket 45 to receive a suitable socket wrench (not shown). The bore 42 of the movable jaw 35 is substantially larger than the shank of the screw 41 to afford adequate clearance corresponding to the clearance between the boring bar recess 33 and the jaw rib 36. The base 47 of the counterbore 43 is arranged, when the jaws 35 is in clamping position, preferably at an angle to the shoulder 49 of the screw so that, when the screw is turned to clamp the jaw 35, the engagement between the shoulder 49 and the bottom 47 is localized as shown at 48 in Fig. 5 at a distance from the pivot rib 36, affording substantial clamp pressure. The counterbore 43 is sufficiently larger in diameter than the cap screw head 44 to allow the clamping action to take place notwithstanding different positions of the jaw 35. It is additionally noted that clearance is afforded between the clamping element 35 and the adjacent boring bar surface 31 to permit such pivotal adjustment of the element 35 as conditions may require, as, for example, when tools of different thicknesses are used.

It is not necessary to remove the jaw 35 in order to remove, adjust or insert a cutting tool. It is necessary merely to turn the screw 41 sufficiently to provide the desired looseness of the jaw 35 for the insertion, adjustment or removal of a tool, and to reverse the rotation of the screw for clamping the tool in place. When one longitudinal cutting edge of the tool becomes worn, the tool may be removed and turned and reinserted and clamped to present another edge for service. All three edges of the triangular tool are thus usable, affording triple service and length of life.

It will be observed that the slot 22 in the relatively stationary jaw 17 is so closely adjacent the front face 18 of said jaw that when a tool is clamped in place as shown, the working end or tip 50 of the tool is located substantially in advance of said face.

This enables the tool to cut in front of such face, so that it is not necessary for the boring bar to be limited in diameter to that of the drilled hole, but, rather, the bar may be of greater diameter. This makes for enhanced rigidity and adaptability to blind holes also, and enables the tool to cut at higher speeds and make heavier cuts without chattering, resulting in greater economy, accuracy and efficiency. Moreover, with the advanced tip, one can bore or counterbore a hole to a finished shoulder. Also, the tool can be gripped nearer the cutting edge or edges, thereby affording further increased support and rigidity for such edge or edges, and greatly increased resistance to chattering.

It is further noted that the jaw face 18 recedes rearwardly toward the idle end 52 of the tool. The maximum depth or pitch of the cut made by the tool is dependent on the distance which the tip of the tool projects forwardly of the opposite end of the surface 18, measured axially of the work 56, and is limited by engagement of such end with that portion 57 of the work which is opposite the tip. Such portion 57 terminates rearwardly of the portion 58 being cut by the tip, by a distance which is of course equal to half the pitch of the cut. It is apparent therefore that the receding face 18 affords greater clearance for the tip, a major portion of allowing the same to make a cut of greater pitch.

With prior constructions used in finishing relatively small holes, for example up to ½ inch, it has been necessary to remove too much stock at the front end of the bar for receiving the tool and set screw, so weakening the bar as to render it too susceptible to breakage and thus requiring the tool to be mounted away from the end of the bar. When so mounted, the tool must project far from the bar in order to project ahead of the bar, requiring a smaller diameter bar which accordingly is too weak. Or if the bit does not project ahead of the bar, the bar must be smaller than the drilled hole to fit in it, to enable the bit to reach the work, so that the size and length of the bar is limited.

With my boring bar and clamp construction tools taking various forms of cut may be employed, as shown. For example, as shown in Fig. 11, the tool 37a may be used to take a bias cut for forming a beveled shoulder and, in Fig. 12, the tool 37b may be used to form a thread. In each of such cases, as the tip wears, the succeeding portions of the tools may be dressed and used, the rake and top angles being inherently constant because of the shape of the tool when made.

It will be observed from Fig. 7 that sufficient metal is provided forwardly of the slot 25, as shown at 62, to withstand the shearing and/or other stresses which arise in service.

The jaw 35 is preferably formed with a chamfer 64 arranged to receive and break up chips or turnings 65 which might otherwise form into attenuated coils, and to guide such and or other turnings forwardly into the hole 60.

The bit made in accordance with my invention may be made of high speed steel, tungsten carbide or other metal. It is ready for use without dressing, and may be made solid, i. e., homogeneous, so that only grinding is needed for resharpening for further use after wearing. When this bit is clamped in accordance with my invention, and the boring bar or other bit holder suitably mounted on the slide rest or other support, the cutting edge or edges of the tip of the bit are at the proper angles or inclinations for service, so that no special grinding is necessary to form a tip after after the bit is purchased.

When boring a blind hole 70 as shown in Fig. 9, the diameter of the bar may approximate that of the finished hole shown in dotted lines at 71, unless the bottom surface 72 of the finished hole is to be made flat, in which event the overall diameter of the bar and bit assembly can be nearly equal to the radius of the finished hole, to enable the tip to be moved the full radius for cutting the bottom surface flat.

The boring bar or other bit holder may be made of nickel steel or other metal and heat treated for best results.

The holder and bit of my invention are of general application, as in toolroom, turret, engine and other lathes, and in screw and jig-boring machines.

Various modifications coming within the spirit of my invention may suggest themselves to those skilled in the art, and hence I do not wish to be limited to the specific form shown or uses mentioned, except to the extent indicated in the appended claims, which are to be interpreted as broadly as the state of the art will permit.

I claim:

1. A counter-boring bar having a fixed forward end face and an elongated open transverse V-channel, said channel having forward and rear walls, said face and the axis of said channel being slightly inclined to each other and to a plane normal to the axis of said bar, said forward wall being inclined transverse to its length substantially 20° to said plane, said inclination of said axis of said channel being greater than that of said face, and means including a jaw cooperating with the forward end portion of said bar for clamping an elongated tool in said channel with the cutting portion of said tool similarly inclined and covering and projecting in advance of the foremost part of said face from a point radially inward to a point radially outward relative to the periphery of said bar, whereby said portion may cut metal from a bore of less diameter than said bar to a bore of greater diameter than said bar in one revolution an axial distance substantially greater than the extent to which said portion projects in advance of said foremost part of said face, said jaw having a chamfer facing forward and arranged to receive turnings and cam them forward into the original bore of the work.

2. A counter-boring bar having a fixed forward end face and an elongated open transverse V-channel, said channel having forward and rear walls, said face and the axis of said channel being slightly inclined to each other and to a plane normal to the axis of said bar, said inclination of said axis of said channel being greater than that of said face, and means including a jaw cooperating with the forward end portion of said bar for clamping an elongated tool in said channel with the cutting portion of said tool similarly inclined and covering and projecting in advance of the foremost part of said face from a point radially inward to a point radially outward relative to the periphery of said bar, whereby said portion may cut metal from a bore of less diameter than said bar to a bore of greater diameter than said bar in one revolution an axial distance substantially greater than the extent to which said portion projects in advance of said foremost part of said face, said jaw having a chamfer facing forward and arranged to receive turnings and cam them forward into the original bore of the work.

JOHN R. PROKSA.